(12) United States Patent
Singh et al.

(10) Patent No.: US 8,335,511 B2
(45) Date of Patent: Dec. 18, 2012

(54) AD-HOC NETWORK FOR ROUTING IN CONSIDERATION OF MOBILITY AND ROUTING METHOD THEREOF

(75) Inventors: Shubhranshu Singh, Yongin-si (KR); Yong-sung Roh, Icheon-si (KR); Jae-hoon Kim, Seoul (KR); Kyung-lim Kang, Suwon-si (KR); Young-gon Choi, Suwon-si (KR); Jung-ho Kim, Suwon-si (KR); Brian L. Mark, Fairfax, VA (US)

(73) Assignees: Samsung Electronics Co., Ltd., Suwon-si (KR); George Mason Intellectual Properties, Inc., Fairfax, VA (US)

( * ) Notice: Subject to any disclaimer, the term of this patent is extended or adjusted under 35 U.S.C. 154(b) by 1112 days.

(21) Appl. No.: 11/332,482

(22) Filed: Jan. 17, 2006

(65) Prior Publication Data

US 2006/0165025 A1 Jul. 27, 2006

(30) Foreign Application Priority Data

Jan. 17, 2005 (KR) ........................ 10-2005-0004124

(51) Int. Cl.
*H04W 40/00* (2009.01)
*H04B 7/00* (2006.01)
*H04L 12/26* (2006.01)
*H04L 12/28* (2006.01)

(52) U.S. Cl. ....... 455/445; 455/41.2; 370/237; 370/238; 370/254

(58) Field of Classification Search .................. 455/41.2, 455/445; 370/252, 254–258, 237–238
See application file for complete search history.

(56) References Cited

U.S. PATENT DOCUMENTS

| | | | | |
|---|---|---|---|---|
| 5,828,987 A | * | 10/1998 | Tano et al. | 702/150 |
| 2002/0024935 A1 | * | 2/2002 | Furukawa et al. | 370/238 |
| 2003/0152034 A1 | * | 8/2003 | Zhang et al. | 370/252 |
| 2003/0200067 A1 | * | 10/2003 | Johnson et al. | 703/2 |
| 2004/0042434 A1 | * | 3/2004 | Kennedy | 370/338 |
| 2004/0218582 A1 | * | 11/2004 | Kennedy et al. | 370/351 |
| 2005/0249186 A1 | * | 11/2005 | Kelsey et al. | 370/349 |

* cited by examiner

*Primary Examiner* — Jean Gelin
*Assistant Examiner* — Michael Mapa
(74) *Attorney, Agent, or Firm* — NSIP Law

(57) ABSTRACT

An ad-hoc network and routing method that takes account of mobility are provided. The ad-hoc network includes at least one node, which calculates a probability that a neighbor node is present in a transmission range of the node, generates a message containing the calculated probability, and transmits the message to the neighbor node. The at least one node may also update the message with a lower probability of the calculated probability and a probability contained in the message, and transmit the updated message to the neighbor node. The node may also determine as a route a path along which a message is transmitted from the message containing the highest probability among probabilities contained in messages that are received.

41 Claims, 4 Drawing Sheets

AD-HOC NETWORK FOR ROUTING IN CONSIDERATION OF MOBILITY AND ROUTING METHOD THEREOF

CROSS-REFERENCE TO RELATED APPLICATIONS

This application claims the benefit of priority under 35 U.S.C. § 119 (a) from Korean Patent Application No. 2005-4124 filed on Jan. 17, 2005 in the Korean Intellectual Property Office, the entire disclosure of which is incorporated herein by reference.

BACKGROUND OF THE INVENTION

1. Field of the Invention

Networks and methods consistent with the present invention relate generally to an ad-hoc network and a routing method thereof, and more particularly, to an ad-hoc network for discovering the most stable route to transmit data from a source node to a destination node and vice versa in consideration of the mobility of nodes establishing the ad-hoc network.

2. Description of the Related Art

A typical mobile communication system transmits data between a mobile element and a base station. The mobile element and the base station transfer data directly to each other without passing through other mobile elements or nodes. By contrast, in an ad-hoc network data may be transferred from a source node to a destination node, and the data can be relayed via other nodes placed between the source node and the destination node.

A construction of a conventional ad-hoc network is explained below in reference to FIG. 1. As shown in FIG. 1, the ad-hoc network includes a source node 100 and a plurality of nodes 110. Although only one source node is illustrated in FIG. 1, more source nodes can be included in the ad-hoc network.

A source node transmits data destined for a destination node. The destination node receives the data from the source node. If the source node is placed within a specified distance from the destination node, the data is directly delivered to the destination node. However, if the source node is beyond the specified distance, the source node cannot transmit the data directly to the destination node. Accordingly, in this situation, the source node forwards the data to neighbor nodes adjacent to the destination node, rather than transferring the data directly to the destination node. As stated above, a node beyond a specified distance transmits data via neighbor nodes in order to minimize the power consumption required for the data transmission. The transmission power is proportional to the distance between the source node and the destination node. Accordingly, a source node, which lies beyond a specified distance from a destination node, transmits the data via the plurality of the nodes and thus minimizes the power consumption for the data transmission.

FIG. 2 illustrates a routing method in an ad-hoc network. The method for routing the data from a source node to the destination node is explained in detail below in reference to FIG. 2. It should be noted that the following method description uses Routing REQuest (RREQ) messages and Routing REPly (RREP) messages to communicate between nodes; however, any type of message known in the art is contemplated and may be used.

The source node A generates a RREQ message containing its location information and location information of the destination node D. The source node broadcasts the generated RREQ message to its neighbor nodes B and C. As shown in FIG. 2, nodes B and C receive the broadcast RREQ message. Upon receiving the RREQ message, the nodes B and C compare their addresses with the destination address contained in the RREQ message. When the destination address does not match their addresses, the nodes B and C update and broadcast the received RREQ message to their neighbor nodes. The updated information includes a hop count.

The RREQ message broadcast from the source node A finally arrives at the destination node D along paths. The destination node determines it is the destination of the RREQ message when the destination address contained in the received RREQ message matches its address. Next, the destination node selects a path having the smallest hop count of hop counts contained in the received RREQ message. That is, the destination node D selects the route having the hop count of 2 which passes through the node B. The destination node D transmits to the source node a RREP message containing the information as to the selected path having the smallest hop count. The source node selects as the route to the destination node the path having the smallest hop count contained in the received RREP message. The source node transmits the data to the destination node along the selected route by way of the node B.

As such, the source node establishes the route and transmits data to the destination node. However, due to the node mobility, radio properties, etc the established route is temporary. In this regard, a routing method in consideration of the mobility of the nodes would be desirable.

A conventional method for taking account of the mobility of nodes adopts the random waypoint model (RWP), but the RWP model is inapplicable to real-time routing protocols under actual network environments. The other methods that exist reflecting the mobility of nodes assume that every node moves rectilinearly with uniform velocity so as to simplify the mobility modeling. However, these methods are problematic because nodes in the ad-hoc network move freely and irregularly with irregular velocity. Hence, it is impossible to predict the mobility of nodes and to establish a stable route in consideration of the irregular mobility of the nodes over actual ad-hoc networks using conventional methods. In the event that a node placed along the established route moves and deviates from the route, it takes a long time to re-establish a route. In addition, it is infeasible to transmit real-time data during the route re-establishment.

SUMMARY OF THE INVENTION

Networks and methods consistent with the present invention provide an ad-hoc network for finding a stable route to transmit data in consideration of the mobility of nodes in the ad-hoc network and for establishing a stable route in advance before a pre-established route is unavailable by predicting mobility of nodes.

According to an exemplary embodiment of the present invention, an ad-hoc network includes at least one node, which calculates a probability that a neighbor node is present in a transmission range over a given time duration, generates a first message containing the calculated probability, and transmits the first message to the neighbor node.

According to another exemplary embodiment of the present invention, an ad-hoc network includes at least one node, which receives a message containing a first probability that a neighbor node is present in a transmission range; compares the first probability from the received message with a second probability that the neighbor node is present in the transmission range; updates the message with the lesser of the first probability and the second probability; and transmits the updated message to neighbor nodes.

According to another exemplary embodiment of the present invention, an ad-hoc network includes at least one node, which receives at least one message containing a probability that a neighbor node is present in a transmission range; selects a route according to the highest probability among the probabilities contained in the at least one message; generates a reply message containing the selected route; and transmits the reply message.

According to another exemplary embodiment of the present invention, a routing method for use in an ad-hoc network comprises calculating a probability that a neighbor node is present in a transmission range, generating a first message containing the calculated probability, and transmitting the first message to the neighbor node.

According to another exemplary embodiment of the present invention, a routing method for use in an ad-hoc network comprises receiving a message containing a first probability that a neighbor node is present in a transmission range; comparing the first probability from the received message with a second probability that the neighbor node is present in the transmission range; updating the message with the lesser of the first probability and the second probability; and transmitting the updated message to neighbor nodes.

According to another exemplary embodiment of the present invention, a routing method for use in an ad-hoc network comprises receiving at least one message containing a probability that a neighbor node is present in a transmission range; selecting a route according to the highest probability among the probabilities contained in the at least one message; generating a reply message containing the selected route; and transmitting the reply message.

According to another exemplary embodiment of the present invention, an ad-hoc network comprises at least one node which, when a probability that a neighbor node, which is on an established route and is present in a transmission range of the at least one node, is less than an effective value, changes the established route.

According to another exemplary embodiment of the present invention, a routing method for use in an ad-hoc network comprises, when a probability that a neighbor node, which is on an established route and is present in a transmission range, is less than an effective value, changing the established route.

BRIEF DESCRIPTION OF THE DRAWINGS

The above and other aspects of the present invention will become more apparent and from the following description of exemplary embodiments, taken in conjunction with the accompanying drawing figures of which.

DETAILED DESCRIPTION OF EXEMPLARY EMBODIMENTS

Figure 1:
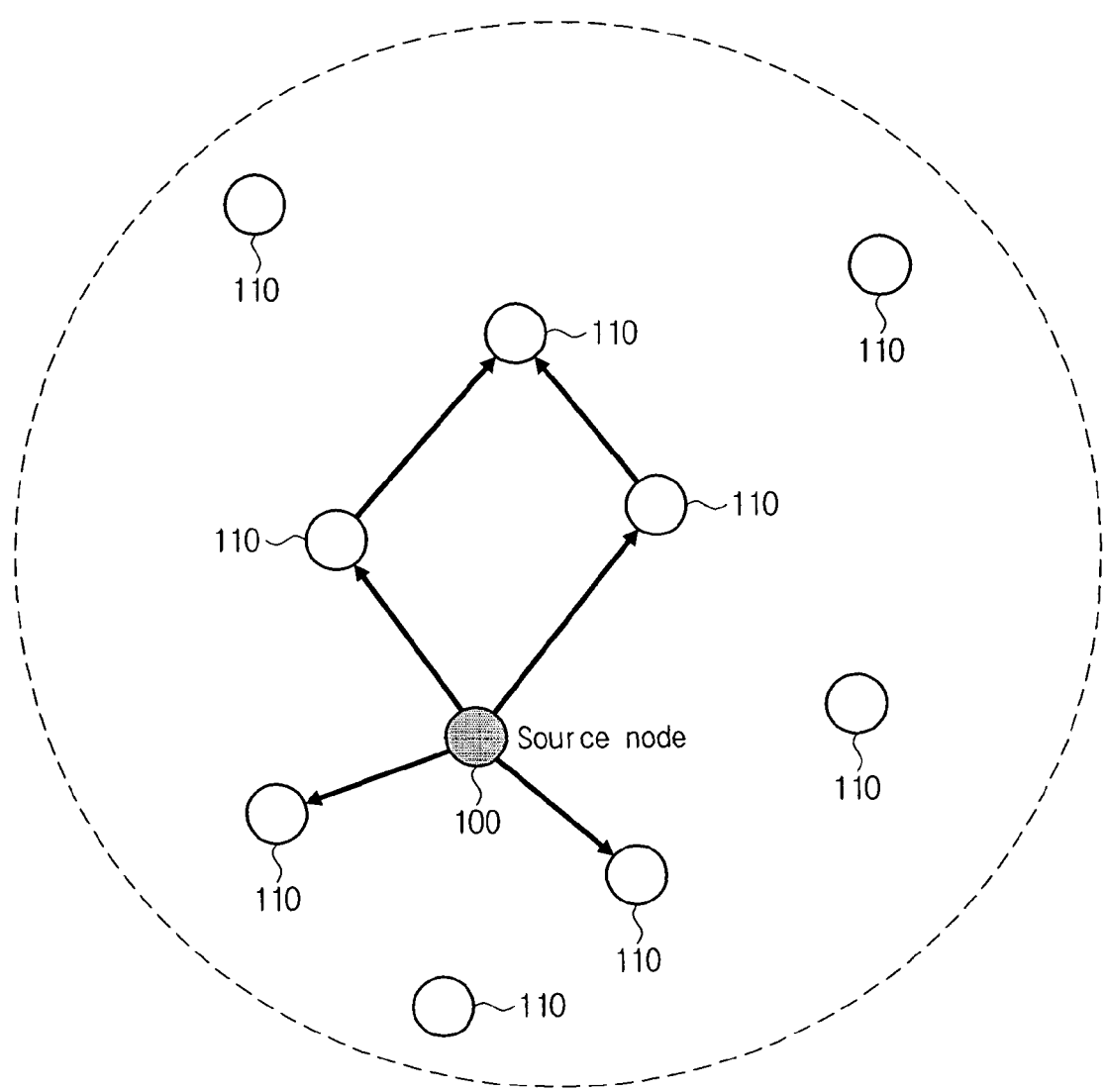
FIG. 1 is a diagram illustrating a construction of a conventional ad-hoc network.
Figure 2:
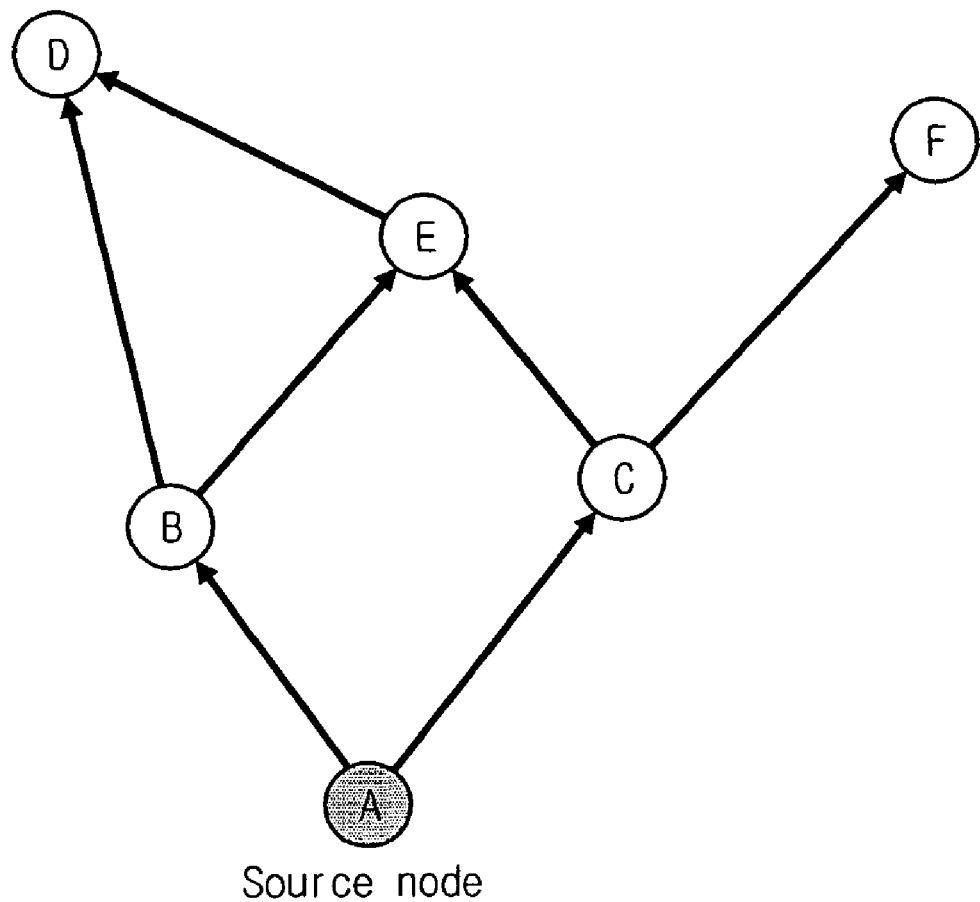
FIG. 2 is a diagram illustrating a routing method in an ad-hoc network.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 3:
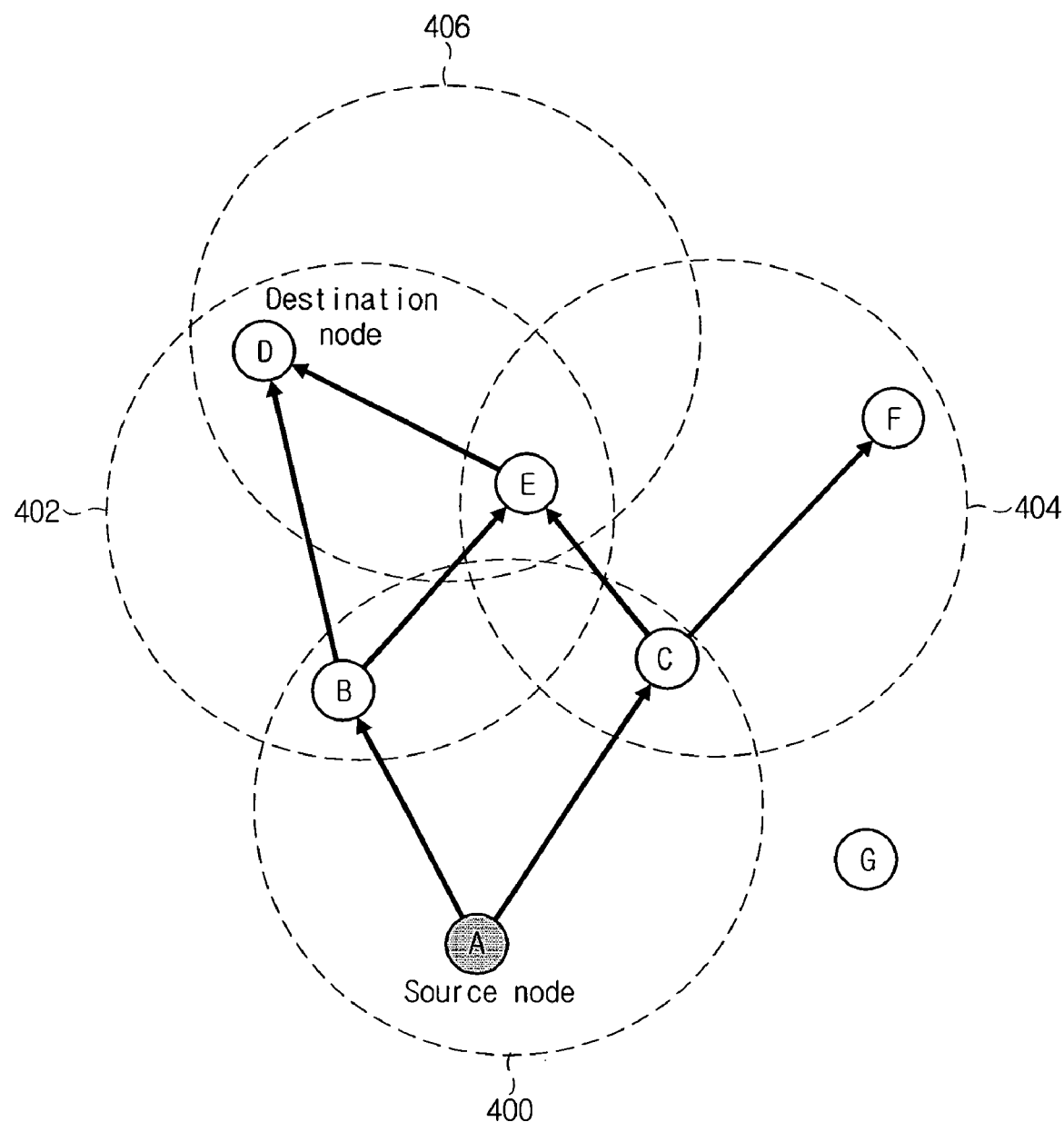
FIG. 3 is a diagram illustrating a routing method in consideration of mobility according to an exemplary embodiment of the present invention.

FIG. 3 illustrates a routing method in consideration of mobility according to an exemplary embodiment of the present invention.

Referring to FIG. 3, an ad-hoc network includes a source node A, a destination node D, a node B, a node C, a node E, a node F, and a node G. The nodes B, C, E, F, and G are relay nodes for relaying data between the source node A and the destination node D. The source node A covers its transmission range 400, the node B covers its transmission range 402, the node C covers its transmission range 404, and the node E covers its transmission range 406. The source node A establishes a route to the destination node D in consideration of the mobility of the nodes.

Specifically, the nodes receive information relating to their mobile status from a global positioning system (GPS) or other system known in the art. The status information relates to a position moving along a X-axis, a velocity moving along the X-axis, an acceleration moving along the X-axis, a position moving along a Y-axis, a velocity moving along the Y-axis, and an acceleration moving along the Y-axis. The nodes obtain their current locations from the received status information. The nodes broadcast the received status information to their neighbor nodes on a regular basis. The nodes take a covariance of the status information since the broadcast status information may be distorted by white noise and carry erroneous information. The nodes append a matrix H to the status information and the covariance value of the status information, and broadcast (Hs, HMH') to their neighbor nodes, where s is the status information, M=Cov(s) denoting the covariance of the status information, and $$H = \begin{bmatrix} 100000 \\ 000100 \end{bmatrix}.$$

Accordingly, the nodes can spot the neighbor nodes and acquire a distance to the neighbor nodes based on their own locations and the locations of the neighbor nodes.

The source node A broadcasts its status information to the neighbor nodes B and C on a regular basis. In the same manner, the node B regularly broadcasts its status information to the source node A, the destination node D, and the node E. The node C regularly broadcasts its status information to the node A, the node E, and the node F. The node E regularly broadcasts its status information to the node B, the node C, and the destination node D. Hence, the source node A spots the node B and the node C, and acquires the distances to the node B and the node C. Likewise, the other nodes can obtain the locations of and the distances to their neighbor nodes using the same procedure.

The source node A calculates a link stability metric with the node B which moves in the transmission range 400.

$$L_{pq,n} = Pr(d_{pq,n+k} \leq d_{th}) \qquad \text{[Equation 1]}$$

Equation 1 of the link stability metric represents a probability of discovering another node in its transmission range over a certain time duration, that is, a probability of maintaining a link to another node. In further detail, the link stability metric is a probability that a link $d_{pq}$ from a node p to a node q is existent within a distance $d_{th}$ of the transmission range over a time duration from a time n to a time k. The distance $d_{th}$ of the transmission range varies depending on a transmission interface and is a fixed value. The distance $d_{th}$ is identical with respect to all of the transmission ranges 400, 402, 404, and 406.

As the node B is placed in the transmission range 400, the source node A calculates a probability of maintaining a link to the node B.

$$Pr(d_{AB,n} \leq d_{th}) = \int_{\lambda=0}^{d_{th}} \int_{\theta=0}^{2\pi} \frac{\lambda}{2\pi |K|^{\frac{1}{2}}} e^{[-\frac{1}{2}(X-\mu)'K^{-1}(X-\mu)]} d\theta \, d\lambda \quad \text{[Equation 2]}$$

Based on Equation 2, the calculation is made of the probability that the node B is existent in the transmission range 400 of the source node A. In this calculation, X, K, and μ are given by Equation 3.

$$X = \begin{bmatrix} x_{B,n} - x_{A,n} \\ y_{B,n} - y_{A,n} \end{bmatrix} = \begin{bmatrix} \lambda \cos\theta \\ \lambda \sin\theta \end{bmatrix} \quad \text{[Equation 3]}$$

$$\mu = E(X) = Hs_{B,n} - Hs_{A,n}$$

$$K = Cov(X) = HM_{B,n}H' + HM_{A,n}H'$$

Equation 3 can be computed using (Hs, HMH') broadcast from the node B. Based on Equations 2 and 3, the source node A computes the probabilities that the node C is existent in the transmission range 400 and that the link to the node C is maintained.

Upon calculating the link stability metric, the source node A generates a Routing REQuest (RREQ) message. The generated RREQ message contains a source address, a destination address, and the link stability metric. In the initial RREQ message, the link stability metric is set to a maximum value. The source node A broadcasts the generated RREQ message to the nodes B and C that are placed in the transmission range 400.

The nodes B and C determine whether their addresses match the destination address of the RREQ message. When the addresses do not match, the nodes B and C compare a previous link stability metric and the calculated link stability metric contained in the received RREQ message. According to a result of the comparison of the link stability metrics contained in the received RREQ message, the nodes B and C update with the lower link stability metric and then broadcast a new RREQ message to neighbor nodes. Since the nodes B and C have received the initial RREQ message having the maximum link stability metric, the link stability metric between the source node and a corresponding node is updated all the time. The updated information also includes a hop count. The relay nodes, receiving the RREQ message from the nodes B and C, check whether the destination address of the RREQ message matches their addresses. When their addresses are different from the destination node, the relay nodes compare the link stability metric contained in the received RREQ message with a link stability metric of a neighbor node which will receive a corresponding RREQ message, update a new RREQ message to be retransmitted with the lower link stability metric, and retransmit the new RREQ message to the neighbor node. By repeating the above procedure, it is possible to compute the stability of a relevant path, and the link stability metric of the most unstable link becomes the link stability metric of the whole paths.

The RREQ message originated from the source node A arrives at the destination node D along paths as mentioned above. The destination node D compares the link stability metrics contained in the received RREQ messages and selects a route with the highest link stability link. Thus, the most stable path is set as the route. For instance, let the link stability metric contained in the RREQ message delivered along the route of 'source node A-node B-destination node D' be 2, the link stability metric contained in the RREQ message delivered along the route of 'source node A-node B-node E-destination node D' be 1, and the link stability metric contained in the RREQ message delivered along the route of 'source node A-node C-node E-destination node D' be 3. The destination node D selects the route of 'source node A-node C-node E-destination node D' because the link stability metric of the selected route is the highest value 3. As a result, the route with the most stable link stability metric becomes the route between the source node A and the destination node D.

In this case, the link stability metric is the primary metric, and the hop count is the secondary metric. Even though the route of 'source node A-node B-destination node D' is the smallest hop count of 2, the destination node D selects the route of 'source node A-node C-node E-destination node D' having the highest link stability metric of 3 as noted above. In the event of equal link stability metrics, the hop counts, which are the secondary metric, are compared and the route with the smaller hop count is selected.

The selected link stability metric is a route stability metric. The route stability metric sets a stable route by taking account of the mobility of nodes placed between the source node A and the destination node D. Hence, the link stability metric 3 is set to the route stability metric. The destination node D generates a Routing REPly (RREP) message containing the route stability metric. The destination node D transmits the generated RREP message to the source node A. The source node A sets the path with the route stability metric, that is, with the highest link stability metric contained in the received RREP message, to the route to the destination node D. The source node A transfers data to the destination node D along the set route. As exemplified above, the source node A determines the path of 'source node A-node C-node E-destination node D' as the route and transfers data to the destination node D along the set route.

Figure 4:
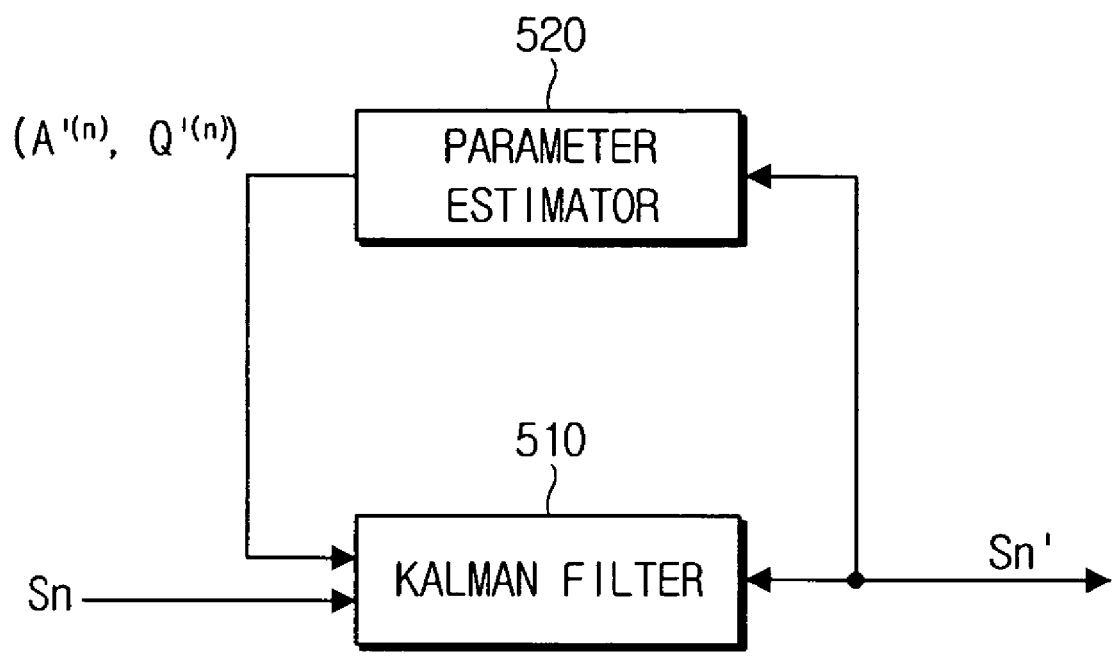
FIG. 4 is a block diagram of a node that takes account of mobility according to an exemplary embodiment of the present invention.

FIG. 4 is a block diagram of a node that takes account of the mobility according to an exemplary embodiment of the present invention.

Referring to FIG. 4, a node in the ad-hoc network includes a Kalman filter 510 and a parameter estimator 520, to maintain, repair, or re-establish a route by predicting a next status according to the mobility.

The node receives status information relating to its mobile status from a GPS. While the status information from the GPS is received at the node, or the status information is broadcast to neighbor nodes, the status information may be distorted due to the white noise and erroneous information may be delivered. The Kalman filter 510 detects an accurate movement change of the node from the noise so as to properly predict the movement change of the node as time passes. The parameter estimator 520 estimates parameters required for predicting the next status according to the movement change of the node.

Hereafter, the mobility of the node is elucidated by way of example of the established route of 'source node A-node C-node E-destination node D' in reference to FIG. 3. The node receives from the GPS the status information pertaining to the position along the X-axis, the velocity along the X-axis, the acceleration along the X-axis, the position along the Y-axis, the velocity along the Y-axis, an the acceleration along the Y-axis. The node broadcasts the received status information to neighbor nodes on a regular basis. The source node A receives the status information of the node C that is placed along the established route. The status information of the node C is fed to the Kalman filter 510 of the source node A. The Kalman filter 510 removes noise from the received status information $s_n$.

$$s_{n+1} = As_s + w_n \quad \text{[Equation 4]}$$

Equation 4 represents the prediction of the next status $s_{n+1}$ by taking account of the mobility of the node by using the status information $s_n$ of the node at a receiving time n. The source node A may predict the next status of the node C from Equation 4. A is a 6*6 transformation matrix. $w_n$ compensates the status information distorted due to the plant noise and $w_n = R_w(k) = \delta_k Q$. When k=0, δ=1, and when k≠0, $\delta_k$=1. Q is a covariance matrix of $w_n$. The matrixes A and Q are parameters required to predict the next status of the node according to the movement, and estimated at the parameter estimator 520. The parameter estimator 520 estimates the matrixes A and Q based on Yule Walker equations.

[Equations 5]

$$A^{(n)} = R_s^{(n)}(1)R_s^{(n)}(0)^{-1} \quad (1)$$

$$R_s^{(n)}(1) = \frac{1}{n-1}((n-2)R_s^{(n-1)}(1) + s_{n-1}s'_n) \quad (2)$$

$$R_s^{(n)}(0) = \frac{1}{n-1}((n-2)R_s^{(n-1)}(0) + s_{n-1}s'_{n-1}) \quad (3)$$

$$Q^{(n)} = \frac{1}{n}((n-1)Q^{(n-1)}(1) + e_n e'_n) \quad (4)$$

$$e_n = s_n - A^{(n)}s_{n-1} \quad (5)$$

Equations 5 are the Yule Walker equations for calculating the matrixes A and Q required to predict the next status of the node C according to the movement. The parameter estimator 520 of the source node A estimates the matrixes A and Q using the status information $s_n$ of the node C, from which the noise is removed by the Kalman filter 510, based on Equations 5. In specific, the parameter estimator 520 obtains the matrix A based on Equation 5-(1) using Equations 5-(2) and 5-(3), and obtains the matrix Q based on Equation 5-(4) using Equations 5-(2), 5-(3), and 5-(5). The matrixes A and Q obtained are fed to the Kalman filter 510. The Kalman filter 510 computes the next status information $s_{n+1}$ of the node C according to its movement using the fed matrixes A and Q, and thus predicts the next status of the node C.

[Equations 6]

$$s_{n+1|n} = As_{n|n} \quad (1)$$

$$s_{n|n} = s_{n|n-1} + K_n(o_n - Hs_{n|n-1}) \quad (2)$$

$$H_n = H_{GPS} \quad (3)$$

$$K_n = M_{n|n-1}H'(HM_{n|n-1}H' + R_\rho)^{-1} \quad (4)$$

$$M_{n+1|n} = AM_{n|n}A' + Q \quad (5)$$

$$M_{n|n} = (I_6 - K_nH)M_{n|n-1}(I_6 - K_nH)' - K_nR_\rho K'_n \quad (6)$$

Equations 6 are used to predict the next status of the node C according to its movement by use of the matrixes A and Q.

Specifically, Equation 6-(1) calculates the prediction value $s_{n+1}$ of the next status of the node C using Equations 6-(2), 6-(3), and 6-(4). The Kalman filter 510 computes $s_{n+1}$ using the matrixes A and Q that are calculated and input from the parameter estimator 520, based Equation 6-(1) using Equations 6-(2), 6-(3), and 6-(4). In Equation 6(2), $s_{n|n}$ is the prediction value of the current status, $s_{n|n-1}$ is the prediction value of the previous status, and $o_n$ is the measured value of the status information $s_n$ of the node C, which is provided from the node C. In Equation 6-(3), $$H = \begin{bmatrix} 100000 \\ 000100 \end{bmatrix}.$$

Equation 6-(5) is used to compute the covariance prediction value $M_{n+1|n}$ of the next status of the node C using Equations 6-(3), 6-(4), and 6-(6). The Kalman filter 510 computes $M_{n+1|n}$ using the matrixes A and Q, which are calculated and provided from the parameter estimator 520, based on Equation 6-(5) using Equations 6-(3), 6-(4), and 6-(6). In Equations 6-(5) and 6-(6), $M_{n+1|n}$ is the covariance prediction value of the current status, and $M_{n+1|n}$ is the covariance prediction value of the previous status. In Equation 6-(5), is the identity matrix.

The source node A calculates the prediction value of the next status and the covariance prediction value of the next status of the node C according to its movement, based on Equations 5 and 6. The source node A computes the link stability metric using the obtained prediction values. The computation of the link stability metric has been illustrated earlier in accordance with Equations 2 and 3 and FIG. 3, and thus will be omitted for conciseness. The source node A compares the computed link stability metric with an effective value. The effective value is a threshold before a neighbor node moves out of its transmission range.

According to a result of the comparison, when the link stability metric is less than the effective value, the source node A predicts the link breakage to the node C which moves out of the transmission range 400 in the next status due to its movement. Upon predicting the link breakage to the node C, the source node A repairs the established route to pass through a node having the stable link stability metric of the link stability metrics with the neighbor nodes. Alternatively, the source node A reselects as the route a path having the second stable route stability metric to the established route, among the stored paths to the destination node D. Alternatively, the source node A may reselect another route by generating the RREQ message. The route establishment method has been elucidated earlier in reference to FIG. 3 and will be omitted for brevity.

In contrast, when the link stability metric is greater than the effective value, the source node A predicts that the link to the node C remains stable as the node C does not move out of the transmission range 400 in the next status, and maintains the established route.

The node C computes the prediction value and the covariance prediction value of the next status of the node E, according to the procedure aforementioned, and obtains the link stability metric by the computed prediction values. When the obtained link stability metric is less than an effective value, the node C predicts the link breakage to the node E since the node E moves out of the transmission range 404 in the next status due to the movement. Upon predicting the link breakage to the node E, the node C generates and sends a link breakage message to the source node A. The link breakage message advises that the established route is to be broken sooner or later. The source node A, receiving the link breakage message from the node C, repairs the established route or reestablishes a new route. Likewise, the node E predicts the next status of the destination node D according to the above-mentioned procedure.

Even when the prediction is made that the link will break due to the mobility of the nodes along the established route, the source node A is able to continue transferring data to the destination node along the established route during the repair of or the reestablishment of the route. Upon link breakage, the source node A transfers data to the destination node along the repaired route or the reestablished route. As such, the link breakage can be predicted and the data can be delivered along the alternative route prior to the link breakage. Therefore, the loss of data packets can be reduced by preventing the retransmission of the data due to the link breakage, and the disconnection time of the data communication can be minimized by shortening a time taken from the recognition of the link breakage to the route reestablishment.

It has been illustrated that the maintenance, the repair, and the reestablishment of the route are performed by predicting the next status due to the mobility of the nodes placed along the established route. It should be appreciated that the route can be maintained, repaired, and reestablished by taking account of the mobility of the nodes in the current status.

As set forth above, it is possible to establish a stable route using the link stability metric, and the route can be efficiently maintained, repaired, and reestablished by predicting the next status in consideration of the mobility of the nodes.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An ad-hoc network, comprising:
   at least one node configured to:
      calculate a probability that a neighbor node is present in a transmission range over a given time duration using predictive information about future mobility;
      generate a first message containing the calculated probability; and
      transmit the first message to the neighbor node,
   wherein the probability is calculated using information received from a global positioning system,
   wherein the probability that the neighbor node is present in the transmission range comprises a link stability metric for determining whether to maintain a link,
   wherein the link stability metric is a primary metric,
   wherein a hop count is a secondary metric, and
   wherein, a route with a higher link stability metric is selected preferentially, and
   in response to the link stability metric for a plurality of neighbor nodes being equal, the hop count of each of the plurality of neighbor nodes are compared; and
   a route with a smaller hop count is selected,
   wherein the link stability metric is set to a route stability metric,
   the route stability metric sets a stable route by predicting the mobility of nodes placed between a source node A and a destination node D based on the calculated probability
   wherein when the link stability metric is less than an effective value, a node predicts a link breakage to another node.

2. The ad-hoc network of claim 1, wherein the first message comprises a Route Reply (RREP) message and/or a periodically broadcast message, comprising the predicted probability.

3. The ad-hoc network of claim 1, wherein the at least one node is further configured to:
   receive a second message containing a set route; and
   transfer data along the set route.

4. The ad-hoc network of claim 1, wherein the link stability metric is calculated using status information that is received from a global positioning system.

5. The ad-hoc network of claim 4, wherein the status information comprises a position moving along an X-axis, a velocity moving along the X-axis, an acceleration along the X-axis, a position moving along a Y-axis, a velocity moving along the Y-axis, and an acceleration along the Y-axis.

6. The ad-hoc network of claim 1, wherein the at least one node is further configured to:
   periodically transmit status information to the neighbor node; and
   periodically update status information received from the neighbor node.

7. An ad-hoc network, comprising:
   at least one node configured to:
      receive a message comprising a first probability that a neighbor node is present in a transmission range over a given time duration;
      compare the first probability from the received message with a second probability that the neighbor node is present in the transmission range;
      update the message with the lesser of the first probability and the second probability; and
      transmit the updated message to neighbor nodes,
   wherein the first probability is calculated using information received from a global positioning system,
   wherein the probability that the neighbor node is present in the transmission range comprises a link stability metric for determining whether to maintain a link,
   wherein the link stability metric is a primary metric,
   wherein a hop count is a secondary metric, and
   wherein, a route with a higher link stability metric is selected preferentially, and in response to the link stability metric for a plurality of neighbor nodes being equal: the hop count of each of the plurality of neighbor nodes are compared; and
   a route with a smaller hop count is selected,
   wherein the link stability metric is set to a route stability metric,
   the route stability metric sets a stable route by predicting the mobility of nodes placed between a source node A and a destination node D based on the calculated probability
   wherein when the link stability metric is less than an effective value, a node predicts a link breakage to another node.

8. The ad-hoc network of claim 7, wherein the message comprises a Route Reply (RREP) message and/or a periodically broadcast message, comprising the predicted probability.

9. The ad-hoc network of claim 7, wherein the link stability metric is calculated using status information that is received from a global positioning system.

10. The ad-hoc network of claim 9, wherein the status information comprises a position moving along an X-axis, a velocity moving along the X-axis, an acceleration along the X-axis, a position moving along a Y-axis, a velocity moving along the Y-axis, and an acceleration along the Y-axis.

11. The ad-hoc network of claim 9, wherein the at least one node is further configured to:
    periodically transmit status information to the neighbor node; and
    periodically update status information received from the neighbor node.

12. An ad-hoc network, comprising:
    at least one node configured to:
        receive at least one message comprising a probability that a neighbor node is present in a transmission range over a given time duration,
        select a route according to the highest probability among the probabilities contained in the at least one message,
        generate a reply message containing the selected route, and
        transmit the reply message,
    wherein the probability is calculated using information received from a global positioning system,
    wherein the probability that the neighbor node is present in the transmission range comprises a link stability metric for determining whether to maintain a link,
    wherein the link stability metric is a primary metric,
    wherein a hop count is a secondary metric, and
    wherein, a route with a higher link stability metric is selected preferentially, and
    in response to the link stability metric for a plurality of neighbor nodes being equal:
    the hop count of each of the plurality of neighbor nodes are compared; and
    a route with a smaller hop count is selected,
    wherein the link stability metric is set to a route stability metric,
    the route stability metric sets a stable route by predicting the mobility of nodes placed between a source node A and a destination node D based on the calculated probability
    wherein when the link stability metric is less than an effective value, a node predicts a link breakage to another node.

13. The ad-hoc network of claim 12, wherein the at least one message comprises a Routing REQuest (RREQ) message.

14. The ad-hoc network of claim 12, wherein the reply message comprises a Routing REPly (RREP) message.

15. The ad-hoc network of claim 12, wherein the link stability metric is calculated using status information that is received from a global positioning system.

16. The ad-hoc network of claim 15, wherein the status information comprises a position moving along an X-axis, a velocity moving along the X-axis, an acceleration along the X-axis, a position moving along a Y-axis, a velocity moving along the Y-axis, and an acceleration along the Y-axis.

17. The ad-hoc network of claim 12, wherein the at least one node is further configured to:
    periodically transmit status information to the neighbor node; and
    periodically update status information received from the neighbor node.

18. The ad-hoc network of claim 12, wherein the highest probability of the probabilities contained in the at least one message comprises a route stability metric for establishing the selected route.

19. The routing method of claim 18, wherein a path having a smallest hop count is selected as the route in response to there being routes with an identical route stability metric.

20. A routing method for use in an ad-hoc network, the method comprising:
    calculating a probability that a neighbor node is present in a transmission range;
    generating a first message comprising the calculated probability; and
    transmitting the first message to the neighbor node,
    wherein the probability is calculated using information received from a global positioning system,
    wherein the probability that the neighbor node is present in the transmission range comprises a link stability metric for determining whether to maintain a link,
    wherein the link stability metric is a primary metric,
    wherein a hop count is a secondary metric, and
    wherein, a route with a higher link stability metric is selected preferentially, and
    in response to the link stability metric for a plurality of neighbor nodes being equal:
    the hop count of each of the plurality of neighbor nodes are compared; and
    a route with a smaller hop count is selected,
    wherein the link stability metric is set to a route stability metric,
    the route stability metric sets a stable route by predicting the mobility of nodes placed between a source node A and a destination node D based on the calculated probability
    wherein when the link stability metric is less than an effective value, a node predicts a link breakage to another node.

21. The routing method of claim 20, wherein the first message comprises a Routing Reply (RREP) message and/or a periodically broadcast message, comprising the predicted probability.

22. The routing method of claim 20, further comprising:
    receiving a second message containing a set route; and
    transferring data along the set route.

23. The routing method of claim 22, wherein the second message comprises a Routing REPly (RREP) message.

24. The routing method of claim 20, wherein the link stability metric is calculated using status information that is received from a global positioning system.

25. The routing method of claim 24, wherein the status information comprises a position moving along an X-axis, a velocity moving along the X-axis, an acceleration along the X-axis, a position moving along a Y-axis, a velocity moving along the Y-axis, and an acceleration along the Y-axis.

26. The routing method of claim 24, wherein:
    status information is transmitted periodically to the neighbor node; and
    status information received from the neighbor node is updated periodically.

27. A routing method for an ad-hoc network, the method comprising:
    receiving a message comprising a first probability that a neighbor node is present in a transmission range;
    comparing the first probability from the received message with a second probability that the neighbor node is present in the transmission range;
    updating the message with the lesser of the first probability and the second probability; and
    transmitting the updated message to neighbor nodes,
    wherein the first probability and the second probability are calculated using information received from a global positioning system,
    wherein the probability that the neighbor node is present in the transmission range comprises a link stability metric for determining whether to maintain a link,
    wherein the link stability metric is a primary metric, wherein a hop count is a secondary metric, and
wherein, a route with a higher link stability metric is selected preferentially, and in response to the link stability metric for a plurality of neighbor nodes being equal:
the hop count of each of the plurality of neighbor nodes are compared; and
a route with a smaller hop count is selected,
wherein the link stability metric is set to a route stability metric,
the route stability metric sets a stable route by predicting the mobility of nodes placed between a source node A and a destination node D based on the calculated probability
wherein when the link stability metric is less than an effective value, a node predicts a link breakage to another node.

28. The routing method of claim 27, wherein the message comprises a Routing Reply (RREP) message and/or a periodically broadcast message, comprising the predicted probability.

29. The routing method of claim 27, wherein the link stability metric is calculated using status information that is received from a global positioning system.

30. The routing method of claim 29, wherein the status information comprises a position moving along an X-axis, a velocity moving along the X-axis, an acceleration along the X-axis, a position moving along a Y-axis, a velocity moving along the Y-axis, and an acceleration along the Y-axis.

31. The routing method of claim 29, wherein:
status information is transmitted periodically to the neighbor node; and
status information received from the neighbor node is updated periodically.

32. A routing method for an ad-hoc network, the method comprising:
receiving at least one message comprising a probability that a neighbor node is present in a transmission range;
selecting a route according to the highest probability among the probabilities contained in the at least one message;
generating a reply message containing the selected route; and
transmitting the reply message,
wherein the probabilities are calculated using information received from a global positioning system,
wherein the probability that the neighbor node is present in the transmission range comprises a link stability metric for determining whether to maintain a link,
wherein the link stability metric is a primary metric,
wherein a hop count is a secondary metric, and
wherein, a route with a higher link stability metric is selected preferentially, and in response to the link stability metric for a plurality of neighbor nodes being equal:
the hop count of each of the plurality of neighbor nodes are compared; and
a route with a smaller hop count is selected,
wherein the link stability metric is set to a route stability metric,
the route stability metric sets a stable route by predicting the mobility of nodes placed between a source node A and a destination node D based on the calculated probability
wherein when the link stability metric is less than an effective value, a node predicts a link breakage to another node.

33. The routing method of claim 32, wherein the at least one message comprises a Routing REQuest (RREQ) message.

34. The routing method of claim 32, wherein the reply message comprises a Routing REPly (RREP) message.

35. The routing method of claim 32, wherein the link stability metric is calculated using status information that is received from a global positioning system.

36. The routing method of claim 35, wherein the status information comprises a position moving along an X-axis, a velocity moving along the X-axis, an acceleration along the X-axis, a position moving along a Y-axis, a velocity moving along the Y-axis, and an acceleration along the Y-axis.

37. The routing method of claim 35, wherein:
status information is transmitted to the neighbor node periodically; and
status information received from the neighbor node is updated periodically.

38. The routing method of claim 32, wherein the highest probability of the probabilities contained in the at least one message comprises a route stability metric for establishing the selected route.

39. The routing method of claim 38, wherein a path having a smallest hop count is selected as the route in response to there being at least one identical route stability metric.

40. The ad-hoc network of claim 1, wherein the effective value is a threshold before a neighbor node moves out of its transmission range.

41. The ad-hoc network of claim 1, wherein when the link stability metric is greater than an effective value, the source node A predicts that a link to another node remains stable as that other node does not move out of a transmission range in a next status and maintains an established route.

* * * * *